United States Patent

[11] 3,617,511

[72] Inventors John W. Jenkins
 Seabrook;
 Charles T. Adams, Houston, both of Tex.
[21] Appl. No. 814,521
[22] Filed Apr. 7, 1969
[45] Patented Nov. 2, 1971
[73] Assignee Shell Oil Company
 New York, N.Y.

[54] RING-OPENING PROCESS
 8 Claims, No Drawings

[52] U.S. Cl.................................................. 208/112,
 208/57, 208/89, 208/145, 208/177, 208/187,
 252/442, 252/466, 260/666 P, 260/667, 260/676 R

[51] Int. Cl........................................................ C10g13/02,
 C07c 5/16, B01j 11/08
[50] Field of Search........................................... 208/111,
 112; 260/676, 667, 666 P

[56] References Cited
 UNITED STATES PATENTS
3,132,087 5/1964 Kelley et al. ................... 708/60

Primary Examiner—Delbert E. Gantz
Assistant Examiner—G. E. Schmitkons
Attorney—Harold L. Denkler ABSTRACT: A process for conversion of cyclic hydrocarbons to paraffins wherein cyclic hydrocarbons are contacted in the presence of hydrogen with a catalyst comprising rhodium or ruthenium on a halogen promoted refractory oxide.

RING-OPENING PROCESS

BACKGROUND OF THE INVENTION

1. Field of the Invention

This invention deals with a process and catalyst for ring opening of cyclic hydrocarbons, the catalyst comprising rhodium or ruthenium supported on a halogen promoted inorganic refractory oxide.

2. Background of the Invention

Processes and catalysts which promote the conversion of cyclic hydrocarbons to paraffins, i.e., ring opening, are becoming increasingly important in the petroleum refining industry. A substantial portion of naturally occurring and synthetically prepared hydrocarbon fractions are naphthenic, i.e., contain significant amounts of cyclic compounds. In some fractions, e.g., gasolines, cyclics are desirable since they are easily converted to high octane number aromatics. In others, however, the presence of aromatics and/or naphthenes is not desirable such as, for example, in jet fuels and high viscosity lubricating oils. Other ring-opening applications include selective conversion of methylcyclopentane in hydrocarbon streams which are to be reformed to aromatics since with certain catalysts, e.g., chromia-alumina, methylcyclopentane is a catalyst poison.

A number of catalysts, e.g., platinum metal and chloride on alumina, are known to the art as useful for ring opening. We have discovered that rhodium or ruthenium supported on a suitable acid-acting refractory oxide provides a superior ring-opening catalyst.

SUMMARY OF THE INVENTION

Broadly defined, the present invention is a process for conversion of cyclic hydrocarbons to paraffins wherein cyclic hydrocarbons are contacted in the presence of hydrogen with a catalyst consisting essentially of rhodium or ruthenium supported on an acid-acting refractory oxide at elevated temperature and pressure.

The process of the invention is especially suitable for conversion of alkylcyclopentanes, e.g., methylcyclopentane, to isoparaffins.

The catalyst of the present invention consists of rhodium or ruthenium composited with a suitable refractory oxide which also contains a halogen promoter.

Suitable refractory oxide supports include those conventionally used in the art for such purposes, such as, alumina, silica, zirconia, magnesia, boria, thoria and mixtures of two or more of these oxides. The preferred oxide is alumina.

The refractory oxide should have incorporated therewith a halogen promoter, preferably chloride. Various means of incorporating halogens with refractory oxides, such as impregnation, are well known in the art.

Generally, the amount of metal composited with the oxide support should be small. For applications envisioned herein, it is suitable to use between about 0.1 to 5 percent by weight metal basis the finished catalyst composite and preferably between about 0.2 to 1 percent by weight.

Alumina, a preferred support for catalysts of the invention, may be prepared by adding a suitable alkaline reagent, such as $NH_4OH$, to a salt of aluminum such as $AlCl_3$ or $Al(NO_3)_3$, in an amount to form aluminum hydroxide, which upon drying forms alumina. The alumina may be formed into any desired shape such as spheres, pills, extrudates, powders or granules. Following drying the alumina should be calcined at high temperature. Various calcination conditions and techniques are well within the skill of the art.

For alumina-based catalysts the amount of halogen promoter is below about 2 percent by weight on the finished catalyst. Chlorine is a preferred promoter and may be incorporated by impregnation of the alumina with a suitable aqueous solution of chloride ions. The chlorine may be added separately or simultaneously with the metal component.

Catalysts which have proved useful were prepared by impregnation of alumina with aqueous solutions of ruthenium chloride or rhodium chloride, followed by drying at 250° F. and calcining for one hour at 950° F.

Impregnation or ion exchange of the metal from a solution of metal complexes is also suitable. For example, the metal may be incorporated by competitive ion exchange between ammonium ions and ions of the chlorometallic acid such as chlororuthenic acid. Amine complexes can also be used.

Various cyclic hydrocarbon feeds may be advantageously processed according to the invention. For example, methylcyclopentane may be ring opened as a relatively pure compound or may be selectively ring opened in a mixture with cyclohexane. Kerosene fractions (generally about 300° F. to 600° F. boiling range fractions) which contain a substantial content of cyclic compounds can be processed. Also, petroleum fractions such as straight-run gasolines and kerosenes, catalytically cracked fractions, heavy naphtha or mixtures thereof, are appropriate.

The process of the invention may be carried out in any suitable equipment, it being preferable to use a fixed bed reactor system wherein the cyclic hydrocarbon feed is passed over or through a stationary bed of catalysts. The reactor effluent is passed to a separation zone where hydrogen-rich gas is recycled to the reaction zone together with fresh hydrogen. Unreacted cyclic hydrocarbons may be separated from the hydrocarbon product and recycled.

Operating conditions will depend on the specific feed composition and catalyst as well as the desired degree of conversion.

In general, ring opening will be effected at pressures between about 100–3,000 p.s.i.g., preferably between about 500–1,500 p.s.i.g. Temperatures should be in the range from about 400° to 750° F., and weight hourly space velocity (in a continuous process) between about 1 and 20 weight of hydrocarbon per hour per weight of catalyst. $H_2$/hydrocarbon mole ratio should be between about 5 and 15. Higher values can be used but are generally not necessary nor economically justified. The catalysts are poisoned by sulfur compounds; thus, for maximum efficient utilization of the process it is desirable that sulfur compounds be substantially removed from the hydrocarbon feed and recycle gas. While some low level of sulfur can be tolerated, catalyst activity is adversely affected.

The present process should be distinguished from reforming which uses similar catalyst composites. In reforming the principal object is to obtain isomerization, cyclization and dehydrogenation. Thus, in reforming, cyclohexane structures are converted to aromatics and alkylcyclopentane compounds are isomerized to cyclohexane compounds which in turn are converted to aromatics. In the present process cyclic hydrocarbons are converted, not to aromatics, but to paraffinic compounds, particularly isoparaffins. This object is obtained by selection of the operating conditions and hydrocarbon feeds which are used.

The following examples serve to further show the advantages and practice of the present invention and are not to be interpreted as a limitation thereon.

EXAMPLE 1

Rhodium and ruthenium catalysts were prepared by impregnation of alumina spheres with aqueous solutions of ruthenium chloride and rhodium chloride, respectively. The impregnated aluminas were dried at 250° F. and calcined for one hour at 950° F.

These catalysts were tested for ring opening of pure methylcyclopentane and mixtures of methylcyclopentane and cyclohexane. The results are shown in table 1 together with results from a platinum/alumina catalyst (a commercial reforming catalyst containing 0.76%w platinum, 0.30%w chlorine and 0.40T fluorine). These data illustrate two important features of the rhodium and ruthenium catalyst as contrasted to the known platinum catalyst.

For constant methylcyclopentane (MCP) conversion, the temperature requirement over rhodium and ruthenium are 175° and 210° F. lower, respectively, than for platinum (despite the higher metal content of the platinum catalyst).

TABLE 1.—RING-OPENING METHYLCYCLOPENTANE AND CYCLOHEXANE

| Catalyst | 0.75% Pt/Al₂O₃ | | | 0.6% Rh/Al₂O₃ | | | 0.6% Ru/Al₂O₃ | |
| --- | --- | --- | --- | --- | --- | --- | --- | --- |
| Conditions: | | | | | | | | |
| Temperature, °F | 675 | 750 | 750 | 500 | 550 | 575 | 465 | 540 |
| Pressure, p.s.i.g. | 1,000 | 1,000 | 1,000 | 1,000 | 1,000 | 1,000 | 1,000 | 1,000 |
| H₂/oil | 15 | 15 | 15 | 15 | 15 | 15 | 15 | 15 |
| WHSV | 4.7 | 4.7 | 4.7 | 7.1 | 7.1 | 7.1 | 7.1 | 7.1 |
| Feed, percent weight: | | | | | | | | |
| MCP | 100 | 50 | | 100 | 50 | | 100 | 50 |
| Cyclohexane | | 50 | 100 | | 50 | 100 | | 50 |
| Net MCP conversion, percent weight basis MCP in feed | 36.2 | 43.0 | | 33.3 | 39.4 | | 33.1 | 51.2 |
| Ring opening, percent weight of total rings | 35.8 | 47.2 | 24.3 | 33.3 | 21.0 | 5.5 | 33.1 | 30.3 |
| Yield, percent weight: | | | | | | | | |
| C₁-C₅ | 0.7 | 4.6 | 3.2 | | | 0.1 | 1.0 | 1.7 |
| 2-methylpentane | 16.7 | 15.3 | 6.7 | 19.9 | 13.1 | 0.1 | 19.0 | 16.3 |
| 3-methylpentane | 10.4 | 8.5 | 4.0 | 8.8 | 5.3 | | 8.6 | 7.5 |
| n-Hexane | 8.0 | 18.8 | 10.4 | 4.6 | 2.6 | 5.5 | 4.5 | 4.8 |
| MCP | 63.8 | 28.5 | 11.3 | 66.7 | 30.3 | 0.4 | 66.9 | 24.4 |
| Cyclohexane | 0.4 | 24.1 | 63.2 | | 48.7 | 94.1 | | 45.3 |
| Benzene | | 0.2 | 1.2 | | | | | |

Secondly, as shown by the mixed feed runs, MCP can be selectively ring-opened in the presence of cyclohexane with the rhodium or ruthenium catalysts.

These differences are surprising in view of the similarity in chemical nature of these metals.

EXAMPLE 2

The rhodium/alumina catalyst was again compared with a platinum catalyst for ring opening a raffinate fraction obtained by extraction of benzene from a reformate fraction. The conditions and results are shown in table 2.

TABLE 2.—RHODIUM-CATALYZED RING OPENING OF METHYLCYCLOPENTANE IN BENZENE RAFFINATE

[Pressure: 500 p.s.i.g.; H₂/oil: 5, molar; LHSV: 5]

| | | Catalyst | |
| --- | --- | --- | --- |
| | Feed | 0.75% Pt/Al₂O₃ | 0.6% Rh/Al₂O₃ |
| Temperature, °F | | 675 | 500 |
| Yield, percent weight: | | | |
| Butanes and lighter | | 3.5 | 1.9 |
| Pentanes | 1.1 | 5.4 | 5.1 |
| Iso-hexanes | 45.2 | 51.0 | 52.9 |
| n-Hexane | 28.5 | 30.0 | 31.3 |
| Methylcyclopentane | 14.1 | 3.0 | 3.0 |
| Heptanes | 11.1 | 7.1 | 5.8 |

As can be seen, the rhodium catalyst is far more active (lower temperature requirement) than the platinum catalyst.

We claim as our invention:

1. A process for conversion of cyclic paraffin hydrocarbons to noncyclic paraffin hydrocarbons which consists essentially of contacting a sulfur-free hydrocarbon fraction containing at least 20%w cyclic paraffin hydrocarbons and boiling from 300° to 600° F., in the presence of hydrogen at a temperature between about 400° to 750° F., a pressure of between about 500-1,500 p.s.i.g., and a hydrogen to hydrocarbon mole ratio of between about 5 and 15, under conditions to effect ring opening substantially without cracking with a catalyst comprising a metal component selected from the group consisting of rhodium and ruthenium and a halogen component supported on a solid inorganic refractory oxide. --

2. The process of claim 1 wherein the refractory oxide is alumina.

3. The process of claim 1 wherein the hydrocarbon fraction contains alkylcyclopentane.

4. The process of claim 1 wherein the halogen component is chlorine.

5. The process of claim 1 wherein the catalyst contains between about 0.1 to 5 percent by weight metal component and below about 2 percent by weight of the halogen component.

6. The process of claim 5 wherein the metal component is rhodium, the halogen component is chlorine and the hydrocarbon fraction contains alkylcyclopentane.

7. The process of claim 6 wherein the metal component is ruthenium.

8. The ring opening process of claim 1 wherein the substantially sulfur-free hydrocarbon fraction containing at least 20%w cyclic paraffin hydrocarbons is selected from the group of feedstocks consisting of alkylcyclopentane-cyclohexane, straight-run gasoline, catalytically cracked gasoline, and mixtures thereof and wherein the catalyst comprises 0.2 to 1%w rhodium or ruthenium and below about 2%w chlorine on an alumina support.

* * * * *